United States Patent [19]

Murakami et al.

[11] Patent Number: 4,737,865
[45] Date of Patent: Apr. 12, 1988

[54] MAGNETIC RECORDING EDITING APPARATUS WITH ERASE HEAD

[75] Inventors: Mitsuaki Murakami, Kanagawa; Yoshiaki Ohgawara, Tokyo, both of Japan

[73] Assignee: Sony Corporation, Tokyo, Japan

[21] Appl. No.: 925,998

[22] Filed: Oct. 31, 1986

[30] Foreign Application Priority Data

Nov. 12, 1985 [JP] Japan .................................. 60-253080

[51] Int. Cl.$^4$ ..................... H04N 5/782; G11B 27/02; G11B 5/024
[52] U.S. Cl. ..................... 360/14.1; 360/66; 360/60
[58] Field of Search ............... 360/14.1, 142, 66, 33.1, 360/60, 67, 68; 358/311, 335

[56] References Cited

U.S. PATENT DOCUMENTS

| | | | |
|---|---|---|---|
| 4,005,481 | 1/1977 | Lockner | 360/60 |
| 4,115,819 | 9/1978 | Shigeta | 360/14.1 |
| 4,390,915 | 6/1983 | Matsuyama | 360/104 |
| 4,520,405 | 5/1985 | Sasaki | 360/14.1 |

*Primary Examiner*—Alan Faber
*Attorney, Agent, or Firm*—Philip M. Shaw, Jr.

[57] ABSTRACT

A helical scan type video tape recorder (VTR) having an editing function mode in which a new video signal can be inserted between a cut-in point and cut-out point on a previously recorded on a video tape. The VTR comprises: a rotary head drum; a rotary video head secured to the rotary head drum for recording video signals on the video tape in a plurality of skewed video tracks; a recording control circuit for supplying a recording current of the new video signal to the video head in response to a recording command signal; a rotary erase head secured to the rotary head drum for erasing a video signal recorded on selected ones of the video tracks, the rotary erase head being positioned to scan the video tracks ahead of the video head by a predetermined interval; and an erasing control circuit for supplying an erasing current, in response to the recording command signal, to the rotary erase head during the editing interval of the editing function mode except for at least one of two intervals in which the rotary erase head traces tracks at the cut-in point and the cut-out point so that the erasing current does not leak to the adjacent track in advance of the cut-in point and to the adjacent track following the cut-out point. Consequently, a fringe effect caused by the operation of the erase head is prevented from affecting other tracks outside the cut-in and cut-out point tracks.

6 Claims, 7 Drawing Sheets

MAGNETIC RECORDING EDITING APPARATUS WITH ERASE HEAD

BACKGROUND OF THE INVENTION

1. Field of the Invention

The present invention relates to a magnetic recording/reproducing apparatus and particularly relates to a helical scan type video tape recorder (VTR) having at least one rotary erase head and having an edit function. More specifically, the present invention relates to the helical scan type video tape recorder (VTR) which prevents a fringe effect caused by the erase head from affecting other tracks than cut-in and cut-out points.

2. Description of the Prior Art

Figure 1:
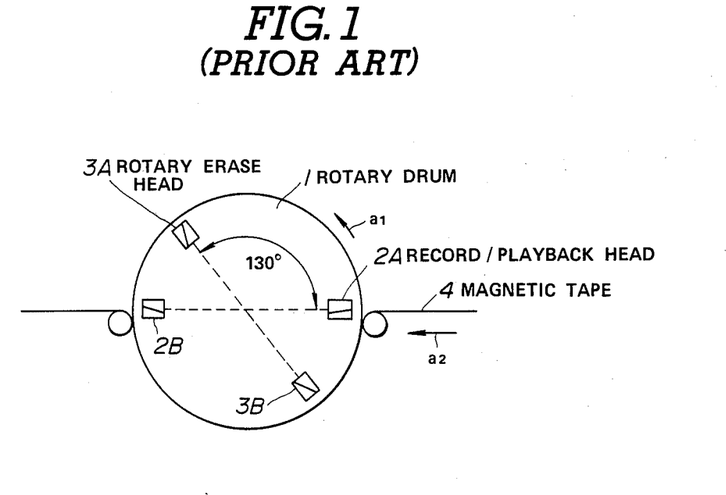
FIG. 1 is a diagram of a rotary drum in a conventional magnetic recording/reproducing apparatus.
Figure 2:
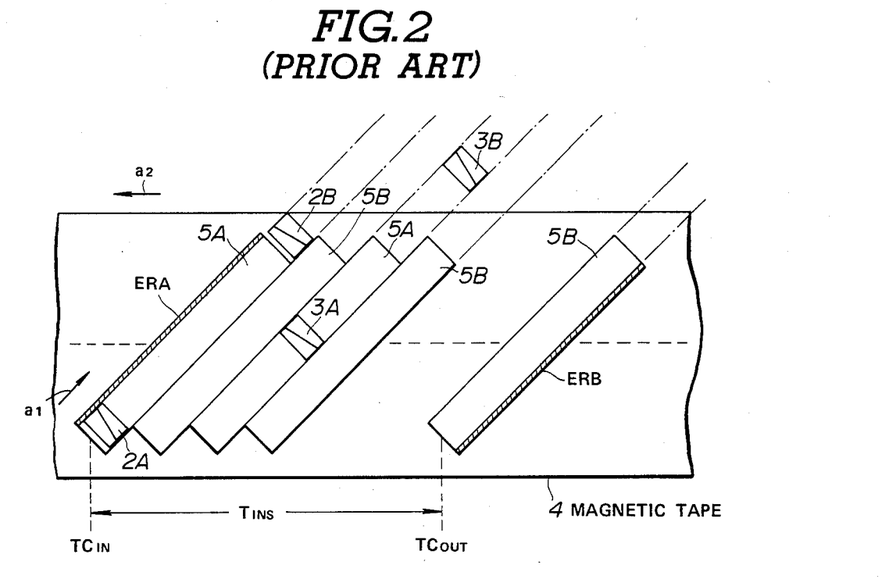
FIG. 2 is a diagram of a track format on the magnetic tape in the magnetic recording/reproducing apparatus shown in FIG. 1.

A conventional magnetic recording/reproducing apparatus in which a rotary erase head is mounted and for which an edit function is provided is illustrated in FIGS. 1 and 2.

As shown in FIG. 1, a pair of record/playback heads (i.e., A head and B head) 2A, 2B are mounted with a mutual angular interval of 180° on a rotary drum 1. Two rotary erase heads 3A and 3B are respectively mounted at angular positions 130° advanced from the record/playback heads 2A, 2B with respect to a rotational direction denoted by a1 of the rotary drum 1.

A magnetic tape 4 is threaded over the outer periphery of a rotary drum 1 and runs in the direction denoted by the arrow a2. The magnetic tape 4 approximately covers a predetermined wrap angle equal to the spacing between the record/playback heads 2A, 2B.

The record/playback heads 2A and 2B are oriented so as to slant across the magnetic tape 4 so as to form record tracks 5A, 5B adjoining each other alternatingly. The record/playback heads 2A, 2B are slanted +7 degrees or −7 degrees of azimuth angles to form the record tracks in a guardbandless format.

On the other hand, the rotary erase heads 3A and 3B are slanted −20 degrees and +20 degrees of azimuth angles, respectively. The rotary erase heads 3A and 3B are mounted at positions offset vertically with respect to the record/playback heads 2A and 2B to an extent corresponding to two tracks. When the two record/playback heads 2A and 2B are recording, the previously recorded signals on the record tracks 5A and 5B are first erased by the rotary erase heads 3A and 3B.

Figure 3:
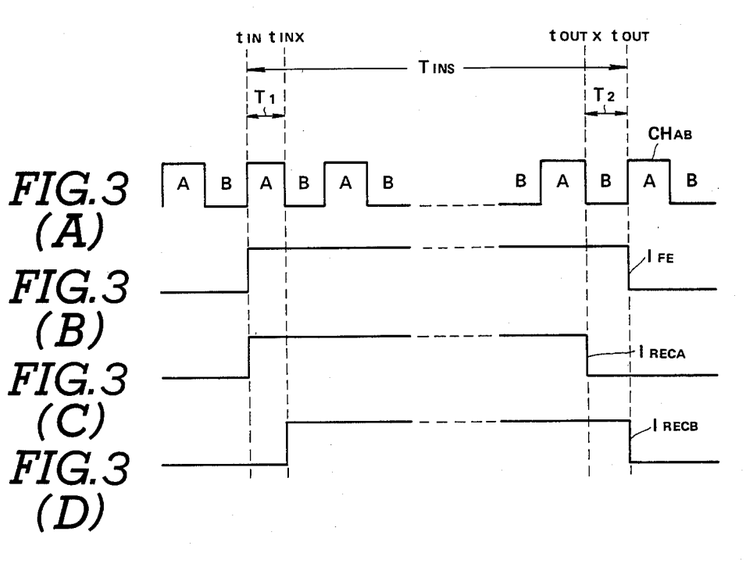
FIGS. 3(A) through 3(D) are signal waveform charts of the erase and record currents in the magnetic recording/reproducing apparatus.

In the construction of the conventional magnetic record/reproduction apparatus, the A and B heads operate alternatingly in response to head switchover signals $CH_{AB}$ (refer to FIG. 3(A)). When insertion editing is carried out, recording currents $I_{RECA}$ and $I_{RECB}$ (refer to FIG. 3(C) and FIG. 3(D)), are conducted through the A and B heads (, i.e., record/playback heads 2A, 2B) with an insertion edit interval $T_{INS}$ covering an integral number of tracks (tracks on which one video frame is recorded). On the other hand, an erase current $I_{FE}$ (refer to FIG. 3(B)) is conducted through the two rotary erase heads 3A and 3B over the entire insertion editing interval $T_{INS}$.

In the conventional magnetic recording/reproducing apparatus shown in FIG. 1 and FIG. 2, the erase current through the rotary erase heads 3A and 3B is about twice as great as the record current so that erasure of low-frequency information components recorded deep in the magnetic tape can be assured.

However, since the erase current is relatively strong, magnetic flux "leaks" to adjacent tracks when the magnetic flux generated from the rotary erase heads 3A and 3B is transmitted toward the record tracks 5A and 5B. This phenomenon (referred to as cross-talk or fringe effect) partially erase fringe portions of tracks adjacent to the record tracks 5A and 5B being erased.

This fringe effect deteriorates the picture quality of the previously recorded video signals at the editing start point (referred to as the cut-in point) and at the editing end point (referred to as the cut-out point) when the insertion editing operation is carried out on magnetic tape 4 on which video information is pre-recorded. That is to say, when the insertion editing operation is carried out in such a way that the recorded signal ranging from a track $TC_{IN}$ at the cut-in point to a track $TC_{OUT}$ at the cut-out point is updated with an insertion signal, e.g., a commercial, an unnecessarily erased part ERA due to the fringe effect of the rotary erase head 3A will appear on the outside of the edge of the cut-in point track $TC_{IN}$ and an unnecessarily erased part ERB due to the fringe effect of the rotary erase head 3B will also appear on the outside of the edge of the cut-out track $TC_{OUT}$. It should be noted that the fringe effect on the tracks between the cut-in track $TC_{IN}$ and the cut-out track $TC_{OUT}$ does not constitute a practical inconvenience since the newly recorded signal overlaps on the original pre-recorded signal.

When the insertion editing operation is carried out in this way, the picture quality of the video signals recorded on the track prior to the cut-in point track $TC_{IN}$ and on the track subsequent to the cut-out point track $TC_{OUT}$ is lowered. For example, when still reproduction for these tracks is carried out, only video images of picture quality lowered to a practically impermissible degree can be reproduced.

SUMMARY OF THE INVENTION

With the above-described problem in mind, it is an object of the present invention to provide a magnetic tape recording/reproducing apparatus which does not damage previously recorded signals on tracks outside the cut-in and cut-out point tracks due to the fringe effect of the rotary erase heads 3A and 3B and which can carry out the insertion editing operation of an insertion editing record signal having a practically adequate picture quality.

The above-described object can be achieved by providing a helical scan type video tape recording apparatus having an editing function mode in which new video signals are inserted between a cut-in point and a cut-out point on a prerecorded video signal, comprising: a rotary head drum (1); a rotary video head (2A, 2B) secured to the rotary head drum for recording a video signal on a video tape in a plurality of skewed video tracks; recording control means (10-14) for supplying recording current of the new video signal to the video head in response to a recording command signal; a rotary erase head (3A, 3B) secured to the rotary head drum for erasing a video signal recorded on selected one of the video tracks, the rotary erase head being positioned to scan the video tracks ahead of the video head by a predetermined interval; and erasing control means (14-19) for supplying an erasing current, in response to the recording command signal, to the rotary erase head during an editing interval of the editing function mode except for at least one of two intervals (T1, T2) in which the rotary erase head traces tracks at the cut-in point and the cut-out point so that the erasing current does not leak to the adjacent track in advance of the cut-in point and to the adjacent track following the cut-out point.

BRIEF DESCRIPTION OF THE DRAWINGS

A more complete understanding of the present invention may be obtained from the following detailed description taken in conjunction with the attached drawings in which.

DETAILED DESCRIPTION OF THE PREFERRED EMBODIMENTS

Reference will hereinafter be made to the drawings in order to facilitate understanding of the present invention. The basic construction of a rotary drum in a magnetic recording/reproducing apparatus and the record format on tracks of a magnetic tape have been described.

FIRST PREFERRED EMBODIMENT

In this embodiment, the positional relationship between the record/playback heads 2A and 2B and corresponding rotary erase heads 3A and 3B is the same as described in with reference to FIG. 1 and FIG. 2. The construction of two-head helical scan video tape recorder (VTR) is also exemplified by a U.S. Pat. No. 4,390,915 issued on June 28, 1983. The above-identified U.S. patent document is hereby incorporated by reference.

It should be noted that although the vertical offset between the heads 2A (2B) and 3A (3B) (an offset space in height as viewed from a rotation center axis of each head) corresponds to two tracks, this varies according to the mode or speeds of the magnetic recording/reproducing system (, e.g., long play mode, short play mode). In practice, the relative spacing thereof to the width of track corresponds to three through six tracks.

Figure 4:
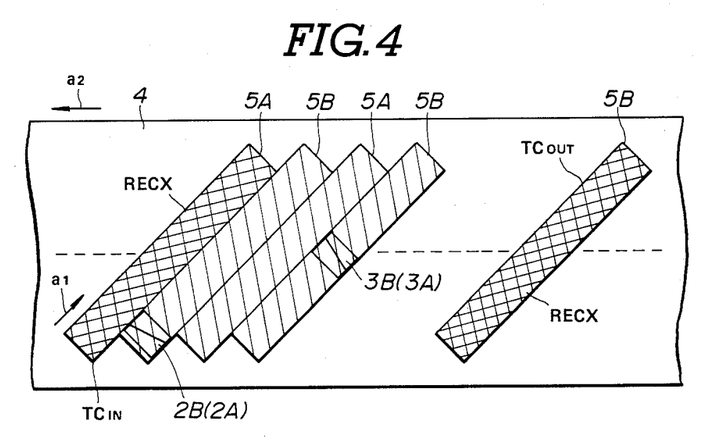
FIG. 4 is a diagram representing a format on the magnetic tape in a first preferred embodiment of the magnetic recording/reproducing apparatus according to the present invention and positions of heads with respect to the format of tracks.

As shown in FIG. 4, the one record-playback head 2A tracks a corresponding track when the insertion editing operation initiates and scans obliquely so as to enable the insertion record signal to be recorded on the previously formed track. On the other hand, the rotary erase heads 3A and 3B erase corresponding tracks.

Figure 5:
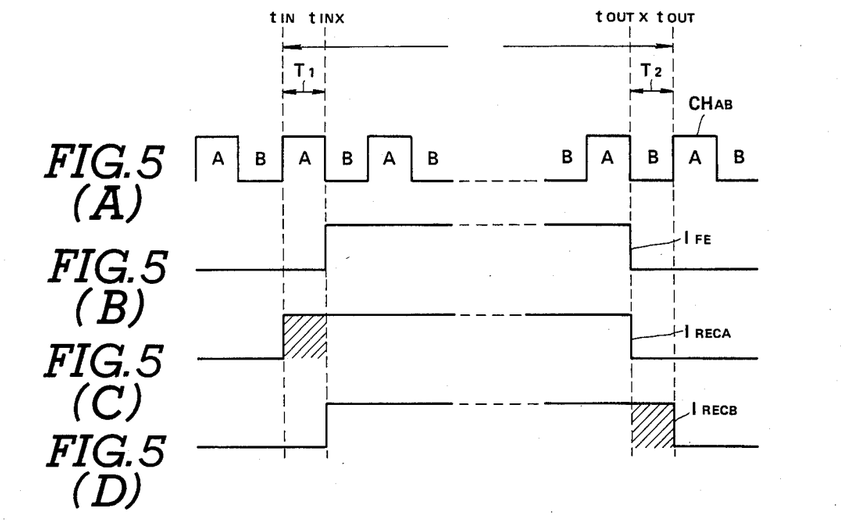
FIGS. 5(A) through 5(D) are signal waveform charts representing erase current and record current in the first preferred embodiment shown in FIG. 4.

However, in this embodiment, the erase current $I_{FE}$ (refer to FIG. 5(B)) is controlled so as not to flow through the erase heads 3A and 3B during a first track interval $T_1$ starting from cut-in time $t_{IN}$ and during the last one-track interval $T_2$ ending at the cut-out time $t_{OUT}$ during the insertion editing operation interval $T_{INS}$ defined by the head change signal $CH_{AB}$ (refer to FIG. 5(B)).

The record current $I_{RECA}$ applied to the A head, i.e., record/playback head 2A is increased by a predetermined percentage (e.g., on the order of 20 to 30 percent) relative to the current used during the first one-track interval $T_1$ starting at the insertion cut-in time $t_{IN}$ as denoted by oblique lines in FIG. 5(C).

Similarly the record current $I_{RECB}$ applied to the B head, i.e., for the record/playback head 2B is increased by the same percentage (i.e., on the order of 20 to 30 percent) during the last one-track interval $T_2$ ending at the cut-out time $t_{OUT}$ as denoted by oblique lines in FIG. 5(D).

Therefore, when the insertion editing operation interval $T_{INS}$ starts at the time $T_{IN}$, the previously recorded signal is not erased by a video signal is recorded by the record current $I_{RECA}$ on the unerased, prerecorded part RECX. The record current $I_{RECA}$ is increased by the same percentage during this period. After the prerecorded video signal is erased by the erase current $I_{FE}$, the insertion record signal is recorded using a record current $I_{RECA}$ at the normal current level.

For the last track 5B of the insertion editing operation interval $T_{INS}$, the prerecorded video signal is not erased by the erase current $I_{FE}$ (refer to FIG. 5(B)) but the insertion record signal is recorded on the unerased, prerecorded part RECX with a record current $I_{RECB}$ increased by the aforementioned percentage with respect to its normal level. After the prerecorded video signal is erased by the erase current $I_{FE}$ in the B head, the insertion record signal is written.

Consequently, at the cut-in point, the erase current $I_{FE}$ is suppressed while scanning over the cut-in point track $TC_{IN}$ so that the unnecessarily erased part ERA (refer to FIG. 2) due to the fringe effect will not appear on the track preceding the cut-in point track $TC_{IN}$. In addition, the record current $I_{RECA}$ is increased for the cut-in point track $TC_{IN}$ and the insertion record signal is recorded on the previously recorded signal of the cut-in point track $TC_{IN}$, so that the influence of unerased low-frequency components can be significantly reduced relative to cases where the insertion record signal is recorded over a previously recorded signal at the normal record current level.

The generation of the unnecessarily erased part ERA due to the fringe effect of the erase current $I_{FE}$ can effectively be prevented at the cut-in point.

In addition, since the erase current $I_{FE}$ through the erase heads is suppressed while scanning over the cut-out point track $TC_{OUT}$, no unnecessarily erased part ERB due to fringe effect will be produced. Furthermore, since the insertion record signal is recorded over the prerecording cut-out point track $TC_{OUT}$ with an enhanced record current $I_{RECB}$, the fringe effect can be practically eliminated.

It should be noted that since the record current flowing through the record/playback heads 2A and 2B during the respective intervals $T_1$ and $T_2$ is increased by about 20 to 30 percent with respect to the normal current value as described above, the record current flowing through the heads exceeds its optimum value. Therefore, a so-called over-modulation phenomenon occurs in the record system so that the contours of the images on a television monitor becomes unnatural. However, this effect is negligible when compared with the above-described crosstalk or fringe effect. In the way described above, the magnetic recording/reproducing apparatus can perform insertion editing without which the generation of unnecessarily erasing prerecorded parts ERA and ERB by the fringe effect due to the flow of erase current $I_{FE}$ while scanning over all of the tracks in the insertion editing interval $T_{INS}$.

SECOND PREFERRED EMBODIMENT

Figure 6:
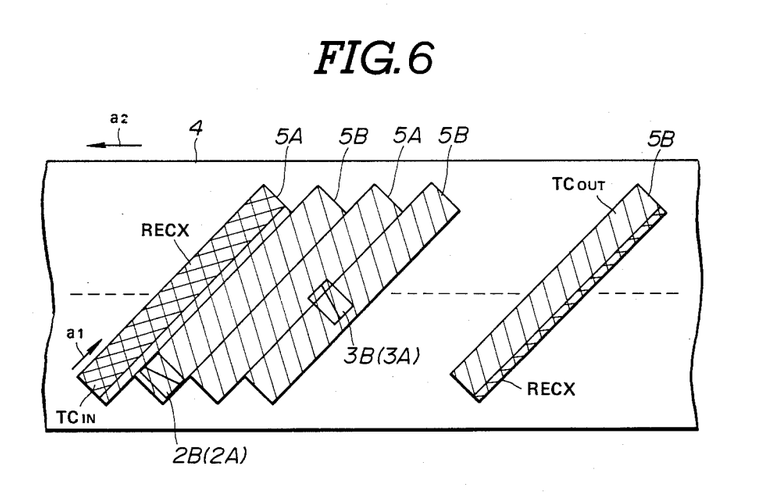
FIG. 6 is a diagram of a format of tracks on the magnetic tape in a second preferred embodiment of the magnetic recording/reproducing apparatus according to the present invention and positions of heads with respect to the format of tracks.

FIG. 6 shows a second preferred embodiment according to the present invention.

In this embodiment, the mounted position of the rotary erase heads 3A and 3B on the rotary drum 1 is selected at a position deviated for a predetermined distance (for example, several micrometers [μm] toward a direction near the cut-in point track with respect to tracks 5A and 5B over which the record/playback heads 2A and 2B scan. Such a deviation of the mounted position can be achieved by changing the vertical height (offset space) of the rotary erase heads 3A and 3B with respect to the record/playback heads 2A and 2B in the rotary drum 1.

Figure 9:
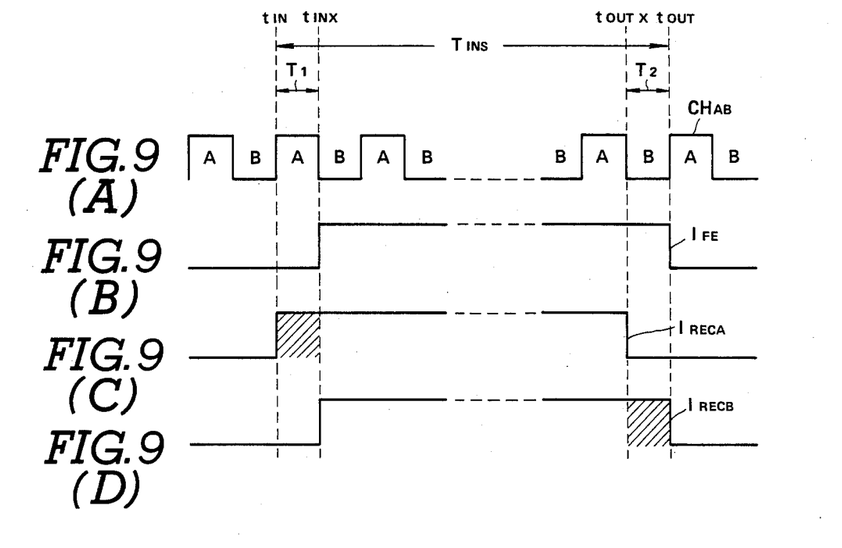
FIGS. 9(A) through 9(D) are signal waveform charts representing erase current and record current in the third preferred embodiment.

The erase current $I_{FE}$ is not caused to flow through the erase heads 3A and 3B during one track interval $T_1$ corresponding to the cut-in point track $TC_{IN}$ as shown in FIG. 9(B). In addition, the erase current $I_{FE}$ is caused to flow therethrough during the one track interval $T_2$ corresponding to the cut-out point track $TC_{OUT}$, as shown in FIG. 9(B).

Furthermore, after the current value of the A head record current is increased by the predetermined percentage during one track interval $T_1$, the level of the A head record current $I_{RECA}$ during the remaining record interval is returned to the normal value, as shown in FIG. 9(C).

Figure 7:
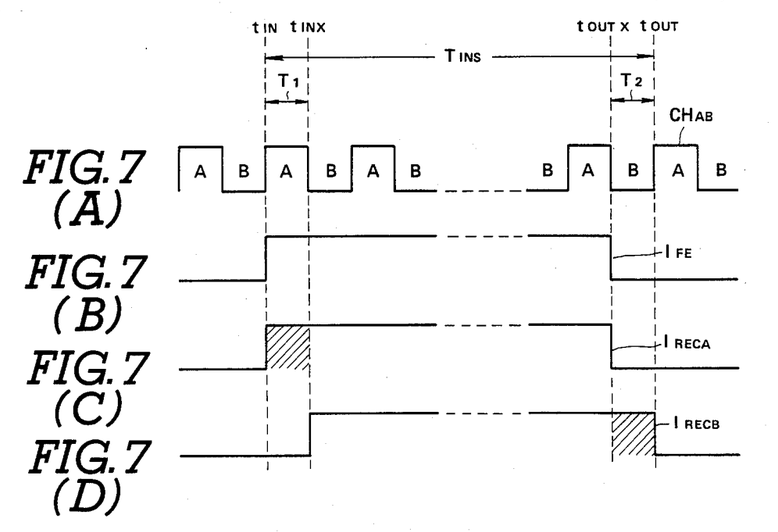
FIGS. 7(A) through 7(D) are signal waveform charts representing erase current and record current in the second preferred embodiment.

The current value of the record current $I_{RECB}$ during one track interval $T_2$ corresponding to the cut-out point track $TC_{OUT}$ is increased by the predetermined percentage during one track interval corresponding to the cut-out point track $TC_{OUT}$, as shown in FIG. 7(D). The record current $I_{RECB}$ is returned to the normal value during the other interval.

Since the erase current $I_{FE}$ is not caused to flow during the time of the corresponding one track interval $T_1$ for the cut-in point track $TC_{IN}$, the record signal is recorded on the unerased part RECX on which the previously recorded signal is unerased through the flow of the A head record current $I_{RECA}$. Consequently, the insertion record signal can be recorded on the cut-in point track $TC_{IN}$ without generation of the unnecessarily erased part ERA due to the fringe effect.

On the other hand, although the erase current $I_{FE}$ is continued to flow during the corresponding one track interval $T_2$ at which the cut-out point track $TC_{OUT}$ is scanned, the mounted position of the erase heads 3A and 3B is, at this time, deviated in the direction toward the cut-in point. Therefore, the fringe effect due to the erase current $I_{FE}$ does not affect the subsequent track to the cut-out point track $TC_{OUT}$ and the unerased part RECX is left on a trailing edge of the track $TC_{OUT}$. Since the B head record current $I_{RECB}$ is caused to flow through the B head having the current value increased more than the normal current value during the scan of the unerased part RECX, the insertion record signal can rewrite the information on the unerased part RECX up to a practically low frequency.

The insertion record signal can be recorded without generation of unnecessarily erased parts ERA and ERB adjacent both cut in and cut out tracks $TC_{IN}$ and $TC_{OUT}$ and without reduction of picture quality in the second preferred embodiment.

THIRD PREFERRED EMBODIMENT

Figure 8:
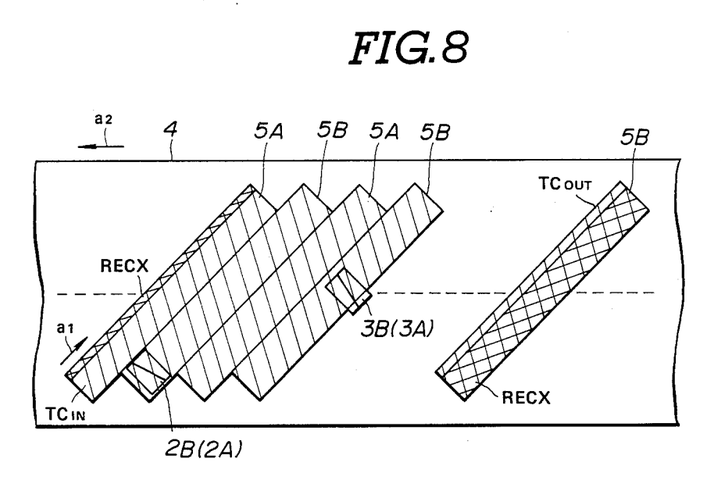
FIG. 8 is a diagram of a format of tracks on the magnetic tape in a third preferred embodiment of the magnetic recording/reproducing apparatus according to the present invention.

FIG. 8 shows a third preferred embodiment according to the present invention.

In this embodiment, the erase heads 3A and 3B are mounted on positions deviated toward the cut-out point track $TC_{OUT}$.

When the rotary erase head 3A scans over the cut out track $TC_{OUT}$, the erase current $I_{FE}$ is controlled so as to flow through the erase head 3A. On the other hand, when the rotary erase head 3B scans over the cut-out point track $TC_{OUT}$, the erase current $I_{FE}$ is controlled so as not to flow therethrough, as shown in FIG. 9(B).

Furthermore, when the record/playback head 2A scans over the cut-in point track $TC_{IN}$, the insertion record signal is recorded with the A head record current $I_{RECA}$ increased more than the normal current value as shown in FIG. 9(C).

When the record/playback head 2B scans over the cut-out point track $TC_{OUT}$ as shown in FIG. 9(B), the B head record current $I_{RECB}$ is increased more than the normal current value.

Since in this embodiment the mounted positions of the erase heads 3A and 3B are deviated toward the direction of the cut-out point, the erasure operation is carried out in such a way that the unerased part RECX is left on the leading edge of the cut-in point track $TC_{IN}$. The insertion record signal is recorded on the previously recorded signal on the unerased part RECX by means of the A head record current $I_{RECA}$ whose value is increased more than the normal current value.

In addition, since the erase current $I_{FE}$ is not caused to flow the corresponding erase head during the scan over the cut-out point track $TC_{OUT}$, the erasure operation is carried out in such a way that the unerased part RECX is left on the cut out track $TC_{OUT}$ and thereafter the insertion record current is recorded over the previously recorded signal on the unerased part RECX by means of the B head record current $I_{RECB}$ having the increased current value.

In the third preferred embodiment, the fringe effect due to the erase current $I_{FE}$ which would be produced on an outside track adjacent to each of the cut in and cut out tracks $TC_{IN}$ and $TC_{OUT}$ can effectively be avoided.

In addition, since the recording of the insertion record signal on the cut-in point track $TC_{IN}$ and cut-out point track $TC_{OUT}$ is carried out by means of the record current increased more than the normal current value, the rewriting by means of the insertion record signal on the unerased part of the already recorded video signal can be carried out at a practically adequate level up to the lower frequency component.

OTHER PREFERRED EMBODIMENTS

Although the control for the erase current $I_{FE}$, and the controls for the A head record current $I_{RECA}$ and B head record current $I_{RECB}$ are carried out during the scan over one track (normally one-field video signal is recorded) at the times of cut-in point and cut-out point, the same effect can be achieved if the processing for the plurality of tracks is carried out.

Figure 10:
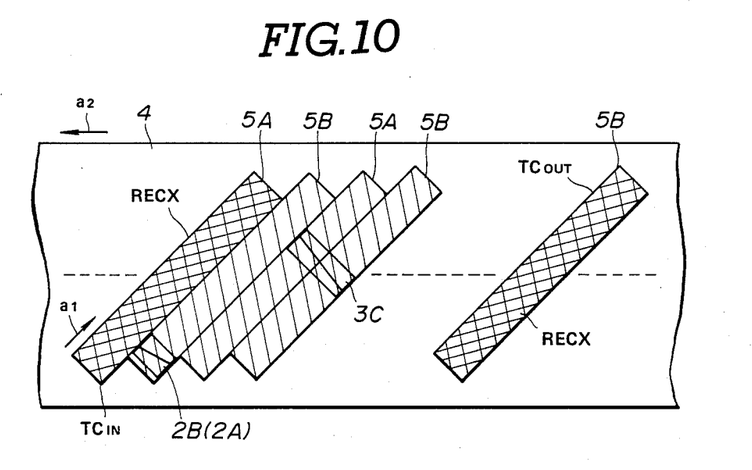
FIG. 10 is a diagram of a format of tracks on the magnetic tape in a fourth preferred embodiment of the magnetic recording/reproducing apparatus according to the present invention.

In addition, although in the above-described preferred embodiments the present invention is applied to the magnetic tape recording/reproducing apparatus in which the pair of erase heads 3A and 3B are mounted so as to correspond to the pair of record/playback heads 2A and 2B, the present invention is also applicable to the magnetic tape recording/reproducing apparatus in which a single erase head 3C causes the mutually adjoining A and B head tracks 5A and 5B to be erased, as appreciated from FIG. 10.

Figure 11:
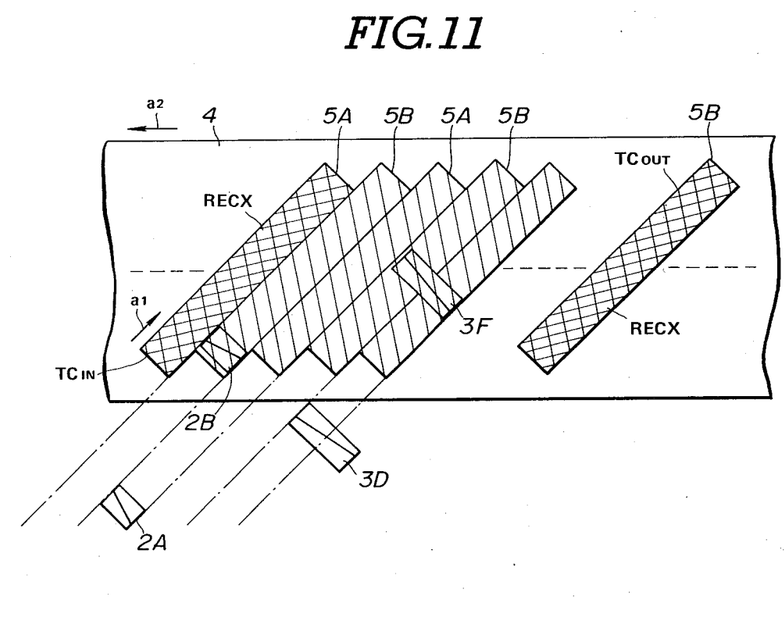
FIG. 11 is a diagram of a format of tracks on the magnetic tape in a fifth preferred embodiment.

Furthermore, as shown in FIG. 11, two erase heads 3D and 3F enable a mutually adjoining pair of tracks 5A and 5B to be erased, respectively and one of the pair of tracks which has been erased by means of the one erase head 3F (and 3D) is further erased by means of the other erase head 3D (and 3F). The present invention is also applicable to this case.

Figure 12:
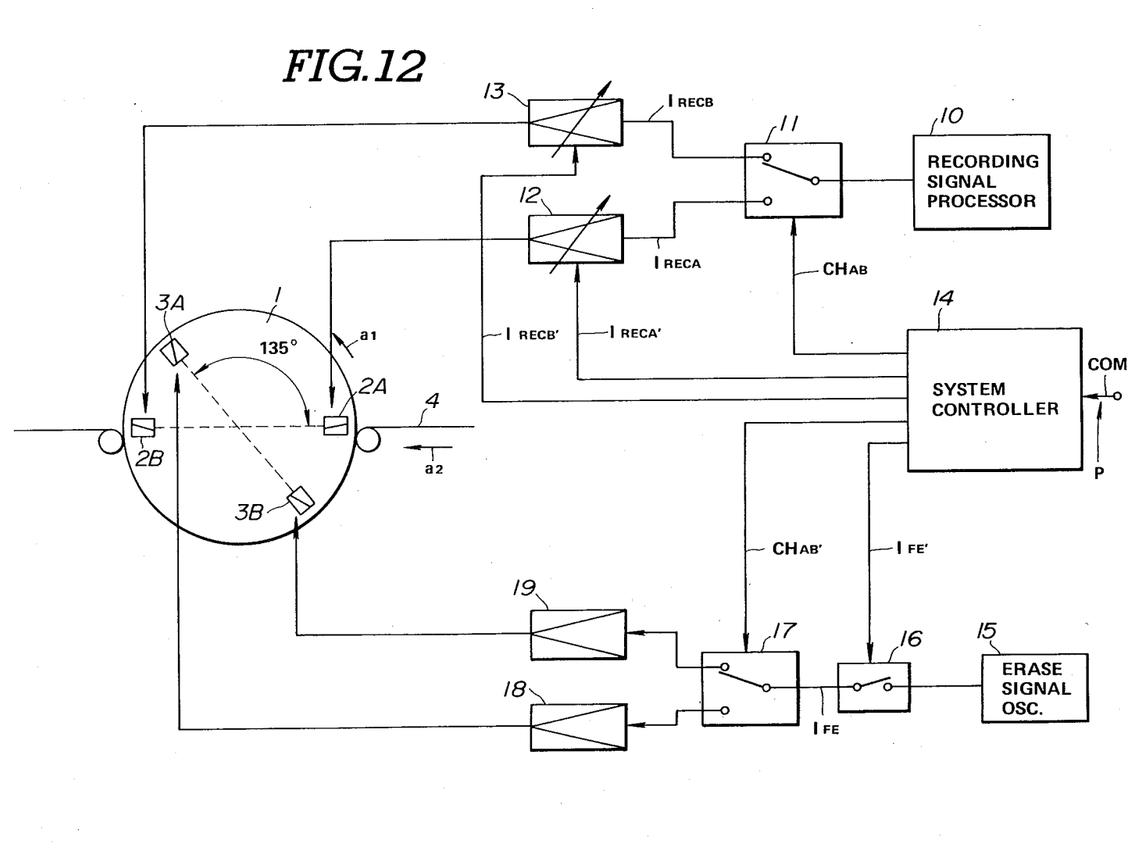
FIG. 12 is a simplified circuit block diagram representing a sixth preferred embodiment of the magnetic recording/reproducing apparatus according to the present invention.

FIG. 12 is a specific electric circuit configuration of the magnetic tape recording/reproducing apparatus according to the present invention.

In FIG. 12, a recording signal processing circuit 10 combines a luminance signal and chrominance signal. These recording video signals are supplied to the recording heads 2A and 2B via the recording head amplifiers 12 and 13. The video signals are branched by means of a switcher 11 which is controlled according to a head switching signal $CH_{AB}$ into two and sent to the respective amplifiers 12 and 13. The current values of the branched recording signals $I_{RECA}$ and $I_{RECB}$ are controlled by means of gain control functions of the amplifiers 12 and 13 during the above-described intervals of $T_1$ and $T_2$.

In FIG. 12, symbol P denotes a command signal for insertion editing operation and symbol $C_{om}$ denotes an input terminal for receiving the command signal.

The gain control functions of the above-described amplifiers 12 and 13 are controlled by means of control signals $I_{RECA}'$, $I_{RECB}'$ derived from a system controller 14. On the other hand, an oscillation output from an erase signal oscillator 15 is sent to the erase heads 3A, 3B via a gating circuit 6, switcher 17, and amplifiers 18 and 19. In the gate circuit 16, the erase current $I_{FE}$ is formed in response to a control signal $I_{FE}'$ derived from the system controller 14 for providing the above-described unerased part. It is noted that the switcher 17 switches the signal $I_{FE}$ into the heads 3A and 3B in response to the above-described head switching signal $CH_{AB}$. As described hereinabove, since according to the present invention the erasure operation is not carried out so as not to have an influence of unnecessary erasure on other tracks adjacent to a track on which the insertion editing operation is carried out due to the fringe effect by erase heads for one or a plurality of tracks present on the cut-in point and cut-out point to be subjected to the insertion editing and the current value of the insertion record signal increased more than the normal current value, the magnetic tape recording/reproducing apparatus which does not have al ill effect on outside tracks of the cut-in point and cut-out point tracks and which can write a record signal having practically good picture quality on the cut in and cut-out points.

It will be clearly be understood by those skilled in the art that the foregoing description is made in terms of the preferred embodiments and various changes and modifications may be made without departing from the scope of the present invention which is to be defined by the appended claims.

What is claimed is:

1. A helical scan type video tape recording apparatus having an editing function mode enabling a new video signal to be inserted between a cut-in point and a cut-out point on a previously recorded video signal, the apparatus comprising:

a rotary head drum;

a rotary video head secured to said rotary head drum for recording a video signal on a video tape in a plurality of skewed video tracks;

recording control means (10-14) for supplying a recording current of said new video signal to said video head in response to a recording command signal;

a rotary erase head secured to said rotary head drum for erasing a video signal recorded on selected ones of the video tracks, said rotary erase head being positioned to scan said video tracks ahead of said video head by a predetermined interval; and erasing control means (14-19) for supplying an erasing current, in response to said recording command signal, to said rotary erase head during an editing interval of said editing function mode except for at least one of two intervals (T1, T2) in which said rotary erase head traces the tracks at said cut-in point and said cut-out point so that said erasing current does not leak to the adjacent track in advance of said cut-in point and to adjacent track following said cut-out point.

2. A helical scan type video tape recording apparatus according to claim 1, wherein said recording control means comprises a gain control amplifier (12, 13) having two stage amplitude gains for enhancing said recording current during both of said intervals (T1, T2) in which said erasing current is not supplied to said rotary erase head at said cut-in point cut-out point.

3. A helical scan type video tape recording apparatus according to claim 2, wherein said erase head is disposed so as to appropriately track said tracks, the erasing control means is operative to control the erasing current so as not to flow through the erase head during the scanning over said cut-in and cut-out points, and the is operative to control the recording current so as to increase the current level to be more than a normal level during scanning over the tracks at the cut-in and cut-out points.

4. A helical scan type video tape recording apparatus according to claim 2, wherein said erase head is disposed at a position deviated by a predetermined distance from the track in a direction towards the cut-in point, the erasing control means is operative to control the erasing current so as not to flow through the erase head during the scanning over the track at the cut-in point, and the recording control means is operative to control the recording current so as to increase the current level more than a normal level during the scanning over the tracks at the cut-in and cut-out points.

5. A helical scan type video tape recording apparatus according to claim 2, wherein said erase head is disposed at a position deviated by a predetermined distance from said track in a direction towards the cut-out point, the the erasing control means is operative to control the erasing current so as not to flow the erase head during the scanning over the track of the cut-out point, and the recording control means is operative to control the recording current so as to increase the current level more than a normal level during the scanning over the tracks at the cut-in and cut-out points.

6. A magnetic recording/reproducing apparatus having an editing function mode enabling a new signal to be inserted between a cut-inpoint and a cut-out point on a previously recorded signal, the apparatus comprising:

(a) a rotary head drum assembly (1, 2A, 2B) for recording first signals on a magnetic tape in a plurality of skewed tracks;

(b) first means (10 through 14) for supplying a recording current of the new signal to a magnetic head of the rotary head drum assembly in response to a recording command signal;

(c) a rotary erase head (3A, 3B) for erasing the first signals already recorded on selected ones of the tracks, the rotary erase head being positioned to scan the tracks ahead of the head by a predetermined interval; and (d) second means (14 through 19) for controlling the supply of an erasing current, in response to the recording command signal, to the rotary erase head during an editing interval of the editing function mode except for at least one of two intervals (T1, T2) during which the rotary erase head traces tracks at the cut-in point and the cut-out point so that the erasing current does not leak to the adjacent tracks in advance of the cut-in point and to the adjacent track following the cut-out point.

* * * * *